United States Patent
Pursifull

(10) Patent No.: US 9,322,355 B2
(45) Date of Patent: Apr. 26, 2016

(54) SYSTEM AND METHOD FOR IMPROVING OPERATION OF AN ENGINE COMBUSTING LIQUEFIED PETROLEUM GAS

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 13/970,510

(22) Filed: Aug. 19, 2013

(65) Prior Publication Data

US 2015/0047610 A1 Feb. 19, 2015

(51) Int. Cl.
| | |
|---|---|
| *F02M 37/04* | (2006.01) |
| *F02D 41/30* | (2006.01) |
| *F02D 41/04* | (2006.01) |
| *F02D 41/06* | (2006.01) |
| *F02D 41/00* | (2006.01) |

(52) U.S. Cl.
CPC ........ *F02D 41/3094* (2013.01); *F02D 41/0025* (2013.01); *F02D 41/0027* (2013.01); *F02D 41/042* (2013.01); *F02D 41/065* (2013.01)

(58) Field of Classification Search
CPC .......................................................... F01P 3/20
USPC ........ 123/495, 41.2, 41.01, 41.31, 41.46, 509
See application file for complete search history.

(56) References Cited

U.S. PATENT DOCUMENTS

| | | | |
|---|---|---|---|
| 4,349,002 A * | 9/1982 | Allen ..................... | F02M 31/10 123/523 |
| 5,479,906 A | 1/1996 | Collie | |
| 6,843,236 B1 | 1/2005 | Shetley | |
| 7,478,628 B2 | 1/2009 | Hines | |
| 8,387,591 B2 | 3/2013 | Surnilla et al. | |
| 2001/0003977 A1 | 6/2001 | Hayashi et al. | |
| 2011/0168132 A1* | 7/2011 | Pursifull ................ | F02M 43/00 123/446 |
| 2011/0168133 A1* | 7/2011 | Pursifull ............ | F02M 37/0064 123/495 |
| 2011/0290203 A1* | 12/2011 | Pursifull ............. | F02D 19/0605 123/41.08 |
| 2013/0055728 A1* | 3/2013 | Lurken ................ | B60H 1/3202 62/7 |
| 2013/0118449 A1 | 5/2013 | Marriott et al. | |
| 2013/0125867 A1 | 5/2013 | Krug | |
| 2014/0214306 A1* | 7/2014 | Badillo ................... | F02D 19/08 701/104 |
| 2014/0366845 A1* | 12/2014 | Kramer ............... | F02D 41/3082 123/464 |

FOREIGN PATENT DOCUMENTS

JP   H09268948 A   10/1997

OTHER PUBLICATIONS

Pursifull, Ross Dykstra, "Method and System for Gaseous and Liquid Fuel Injection," U.S. Appl. No. 13/973,842, filed Aug. 22, 2013, 35 pages.

* cited by examiner

*Primary Examiner* — John Kwon
(74) *Attorney, Agent, or Firm* — Julia Voutyras; Alleman Hall McCoy Russell & Tuttle LLP

(57) ABSTRACT

A method and system for improving operation of an engine that is supplied a fuel having a low super critical temperature is presented. In one example, the method supplies fuel to cool a direct injection fuel pump and participate in combustion in an engine cylinder after the fuel is vaporized. The method also provides for injecting a liquid fuel to the engine cylinder via the direct injection fuel pump.

15 Claims, 4 Drawing Sheets

SYSTEM AND METHOD FOR IMPROVING OPERATION OF AN ENGINE COMBUSTING LIQUEFIED PETROLEUM GAS

FIELD

The present description relates to a system for improving operation of an internal combustion engine that is operated with liquefied petroleum gas. The method may be particularly useful for engines are boosted to operate with intake pressures above ambient pressure.

BACKGROUND AND SUMMARY

Liquefied petroleum gas (LPG) may be used as a fuel for an internal combustion engine. LPG may be primarily comprised of propane and it has a relatively low super critical temperature of about 96° C. If LPG is elevated to temperatures greater than its critical temperature, it may be supplied to an engine in an unknown density, somewhere between a gaseous and liquid state. If LPG is supplied to the engine at temperatures less than its critical temperature, it may be supplied to the engine via fuel injectors in a liquid state. LPG in a liquid phase exits a fuel injector and flashes to a gaseous state with great rapidity. Supplying LPG in a liquid state may be desirable because liquid fuel may be supplied directly into a cylinder where it evaporates and cools the cylinder air-fuel mixture so that the engine may tolerate additional spark advance and be less prone to engine knock. However, engine compartment temperatures may reach levels higher than the critical temperature of LPG. Consequently, there may be conditions when LPG changes state to supercritical before being injected to the engine. Injecting a desired amount of fuel becomes difficult due to the unknown fluid density. The fuel's state change from liquid to supercritical fluid may result in engine air-fuel ratio errors.

The inventors herein have recognized the above-mentioned disadvantages and have developed a method for operating an engine, comprising: cooling a direct injection fuel pump with a liquid fuel, the liquid fuel not pumped via the direct injection fuel pump.

By cooling a direct injection fuel pump, or fuel pump and fuel rail, with a fuel that is not pumped by the direct injection fuel pump, it may be possible to supply fuel to the engine in known states so that the possibility of air-fuel errors may be reduced. For example, a fuel that cools the direct fuel injection pump and/or fuel rail evaporates and may be injected to the engine via a port fuel injector. On the other hand, fuel pumped through the cooled direct injection fuel pump may be injected directly into engine cylinders via direct injectors. In this way, the engine may be supplied fuel in known states so that fuel injection timing may be adjusted to provide a desired ratio of air and fuel to the engine. In one example, the gaseous fuel may be supplied to the engine when the direct injection fuel pump temperature is high enough to vaporize fuel pumped by the direct injection fuel pump. Liquid fuel may be supplied to the engine when direct injection fuel temperature is low enough to pump fuel through the direct injection fuel pump in a liquid state.

To achieve a desired amount of under hood fuel cooling, the engine system may source the first portion of it fuel via vapor. As the vapor injection pressure diminishes due to fuel cooling, the balance of the fueling may be sourced via the liquid injection system (e.g., direct fuel injection). During conditions where maximum engine power is desired, engine power may be increased by injecting most of all of the fuel supplied to the engine as a liquid into engine cylinders. For a hot under hood conditions where the fuel flow rate is low, all fuel provided to the engine may be injected in a gaseous state. Further, at cold ambient temperatures, all the fuel injected may be injected as liquid. Additionally, anytime vapor injection is occurring, so is direct injection pump and/or direct injection rail evaporative cooling. At high fuel flow rates where the injection method is primarily liquid, direct injection pump and direct injection fuel rail cooling occurs via replacing the hot fuel with cooler fuel from the fuel tank.

The present description may provide several advantages. In particular, the approach may reduce engine air-fuel ratio errors by allowing fuel to be injected in a known state. Further, the approach may remove a large amount of heat from a direct injection fuel pump via leveraging evaporative cooling. Further still, the approach may also improve the way boost is provided to an engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to improving operation of an engine that combusts LPG. The engine may be included in a system as is described in FIG. 1. Fuel may be supplied to the engine via a fuel system as described in FIG. 2. LPG may be supplied to an engine in a liquid or gaseous state according to the method of FIG. 3. The method of FIG. 3 may provide engine operation as indicted in FIG. 4.

Figure 1:
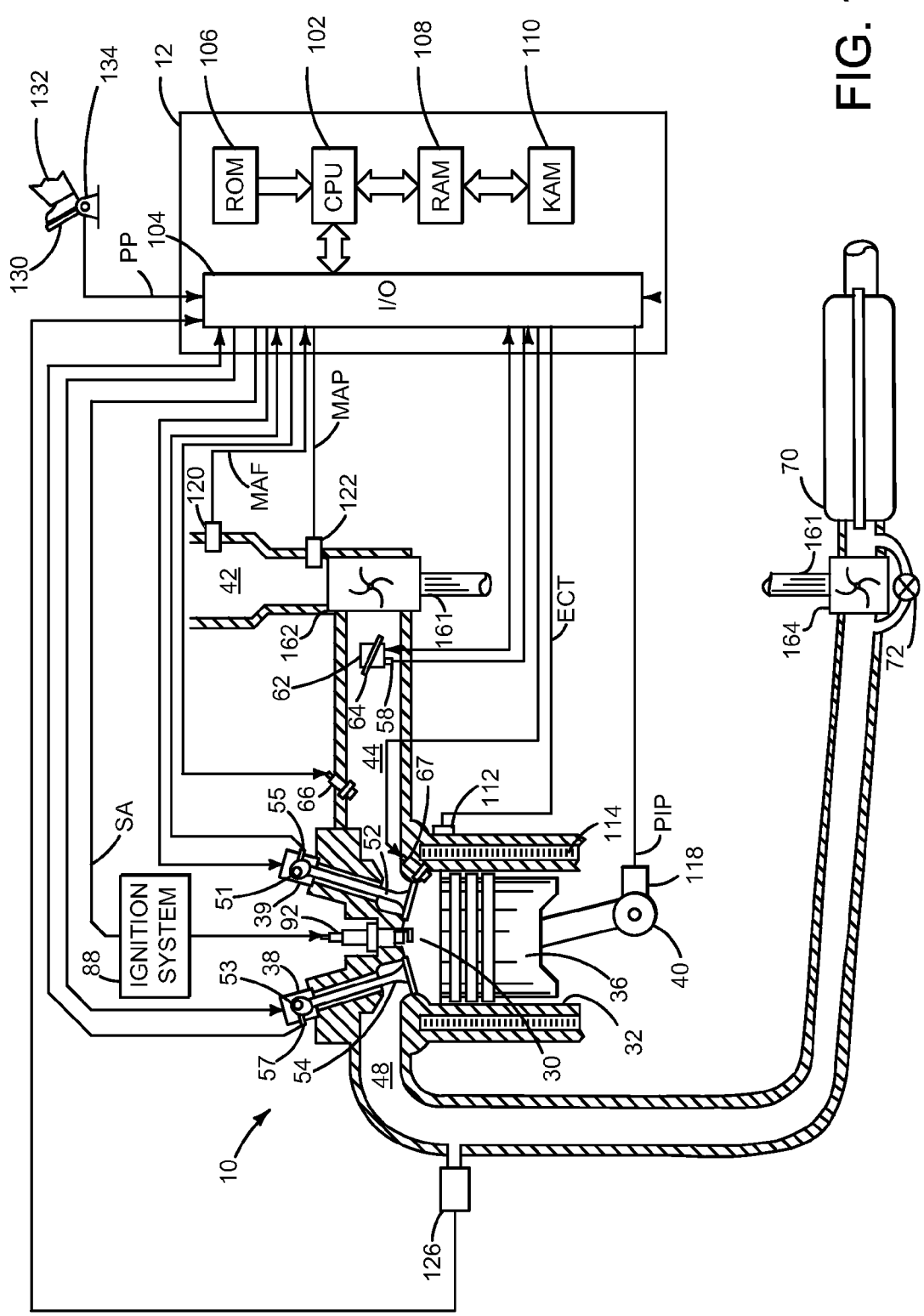
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Timing of intake cam 51 and exhaust cam 53 may be moved relative to crankshaft 40 via exhaust cam phaser 38 and intake cam phaser 39. The position of intake cam 51 may be determined by intake cam sensor 55. The position of exhaust cam 53 may be determined by exhaust cam sensor 57.

Direct fuel injector 67 is shown positioned to inject liquid fuel directly into cylinder 30, which is known to those skilled in the art as direct injection. Fuel injector 67 delivers liquid fuel in proportion to the pulse width of signal from controller 12. Fuel is delivered to fuel injector 67 by a fuel system (FIG. 2) including a fuel tank, fuel pump, and fuel rail. Gaseous fuel may also be supplied to cylinder 30 via port fuel injector 66. In addition, intake manifold 44 is shown communicating with optional electronic throttle 62 which adjusts a position of throttle plate 64 to control air flow from air intake 42 to intake manifold 44.

Turbocharger compressor 162 compresses air from air intake 42 before supplying the air to the intake manifold. Turbocharger compressor 162 rotates via engine exhaust gas energy supplied to turbine 164. Shaft 161 mechanically couples turbocharger compressor 162 to turbine 164. Waste gate 72 may be selectively opened and closed to control a speed of compressor 162. Waste gate 72 allows exhaust gases to bypass turbine 164 when compressor 162 is approaching an upper compressor speed.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a V or I configuration engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
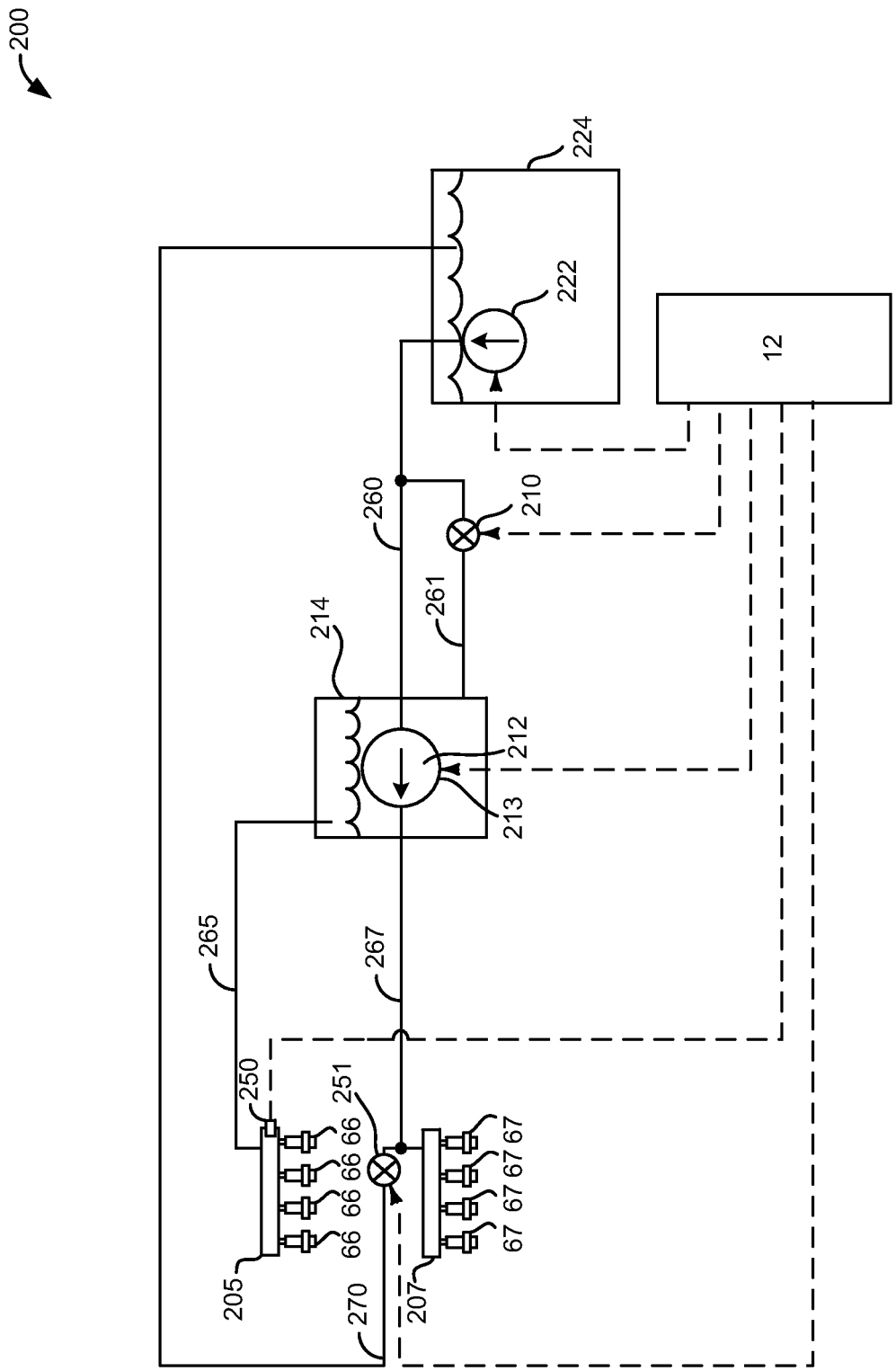
FIG. 2 is an example system for supplying fuel to the engine.

Referring now to FIG. 2, an example fuel system is shown. Electrical control lines are shown as dashed lines. Fluidic passages or conduits are shown as solid lines.

Fuel system 200 includes a fuel tank 224 for storing LPG. Fuel stored in fuel tank 224 may be pumped out of fuel tank 224 via lift pump 222. Operation of lift pump 222 is controlled by controller 12. For example, controller 12 may increase commanded fuel volume via increasing voltage or current supplied to lift pump 222, thereby increasing lift pump output pressure. Controller 12 may decrease commanded fuel volume via decreasing voltage or current supplied to lift pump 222, thereby reducing lift pump output pressure. Lift pump supplies LPG to direct injection fuel pump 212 via fuel passage or conduit 260. Lift pump also supplies LPG to evaporator 214 to cool exterior 213 of direct fuel injection pump 212. Direct injection fuel pump 212 is shown entirely enclosed within evaporator 214. However, only a portion of direct injection fuel pump 212 may be enclosed within evaporator 214 in other examples. LPG within evaporator may evaporate when LPG encounters direct injection fuel pump 212. LPG cools direct injection fuel pump 212 via evaporative cooling. In addition to the direct injection fuel pump, the direct injection fuel rail may be jacketed or enclosed within an evaporator. The evaporator surrounding the direct injection fuel rail may be supplied with fuel that covers an outside of the fuel rail so that heat may convert fuel surrounding the direct injection fuel rail into gaseous fuel. Thus, the direct injection fuel rail may be cooled in a similar way as the direct injection fuel pump.

Direct injection fuel pump 212 may provide liquid fuel to fuel rail 207 and direct fuel injectors 67 when a temperature of direct injection fuel pump 212 is less than a threshold temperature. By supplying liquid fuel to the engine, engine efficiency and performance may be improved since the engine may tolerate greater spark advance and higher boost pressures. The liquid fuel changes state to a gaseous fuel within the engine cylinder, thereby cooling the in cylinder air-fuel mixture. The lower cylinder charge temperature allows spark to be advanced toward minimum spark for best torque (MBT) as compared to spark timing for the same fuel injected in a gaseous state. Optional return valve 251 may be selectively opened and closed. Opening return valve 251 allows fuel to be returned to fuel tank 224 and fuel passages 270. In some examples, LPG in fuel passage 267 or fuel rail 207 may vaporize after engine rotation is stopped and engine heat increases. Therefore, return valve 251 may be opened to purge gaseous fuel from the liquid fuel delivery path.

Gaseous fuel formed via evaporative cooling may be supplied to port fuel injectors 66 via fuel passage or conduit 265. The opening and closing times of injectors 66 may be adjusted in response to output of pressure sensor 250 to provide a desired amount of LPG in a gaseous phase.

Controller 12 operates return valve 251 when doing so would encourage the fuel rail 207 to fill with liquid fuel (e.g., when fuel temperature in direct injection fuel rail 207 is greater than a threshold temperature). Controller 12 also operates evaporator cooling valve 210 to supply LPG to an exterior portion 213 of direct injection fuel pump 212. Controller 12 also selectively operates direct fuel injectors 67 and port fuel injectors 66. Additionally, controller 12 adjusts an inlet flow control valve of direct fuel injection pump 212 to control direct injection pump output pressure.

Thus, the system of FIGS. 1 and 2 provides for an engine system, comprising: an engine including a cylinder; a port fuel injector supplying fuel to the cylinder; a direct fuel injector supplying fuel to the cylinder; and a direct injection fuel pump supplying a first fuel to the direct fuel injector, at least a portion of the direct injection fuel pump positioned within an evaporator. Optionally, the system may include a direct injection fuel rail that is in thermal contact with a cavity of an evaporator such that the direct fuel injection fuel rail causes LPG surrounding the direct injection fuel rail to evaporate and thus provides cooling when the fuel vapor is being ingested by the engine via port fuel injectors. The engine system further comprises a controller, the controller including executable instructions stored in non-transitory memory for controlling flow of the first fuel to cool the direct injection fuel pump, the first fuel not pumped via the direct injection fuel pump and the first fuel surrounding at least a portion of an exterior of the direct injection fuel pump. The engine system further comprises additional instructions for adjusting output of the direct injection fuel pump. The engine system further comprises additional instructions for operating a lift pump supplying the first fuel to the direct injection fuel pump. The engine system further comprises additional instructions for operating the direct injection fuel pump, and pumping a second fuel to the direct fuel injector via the direct injection fuel pump, and where the first fuel and the second fuel are a same type of fuel. The engine system further comprises additional instructions for injecting the first fuel via the port fuel injector. The engine system further comprises additional instructions to limit engine boost based on injecting fuel via the port fuel injector and instructions to limit engine boost based on injecting fuel via the direct fuel injector.

Figure 3:
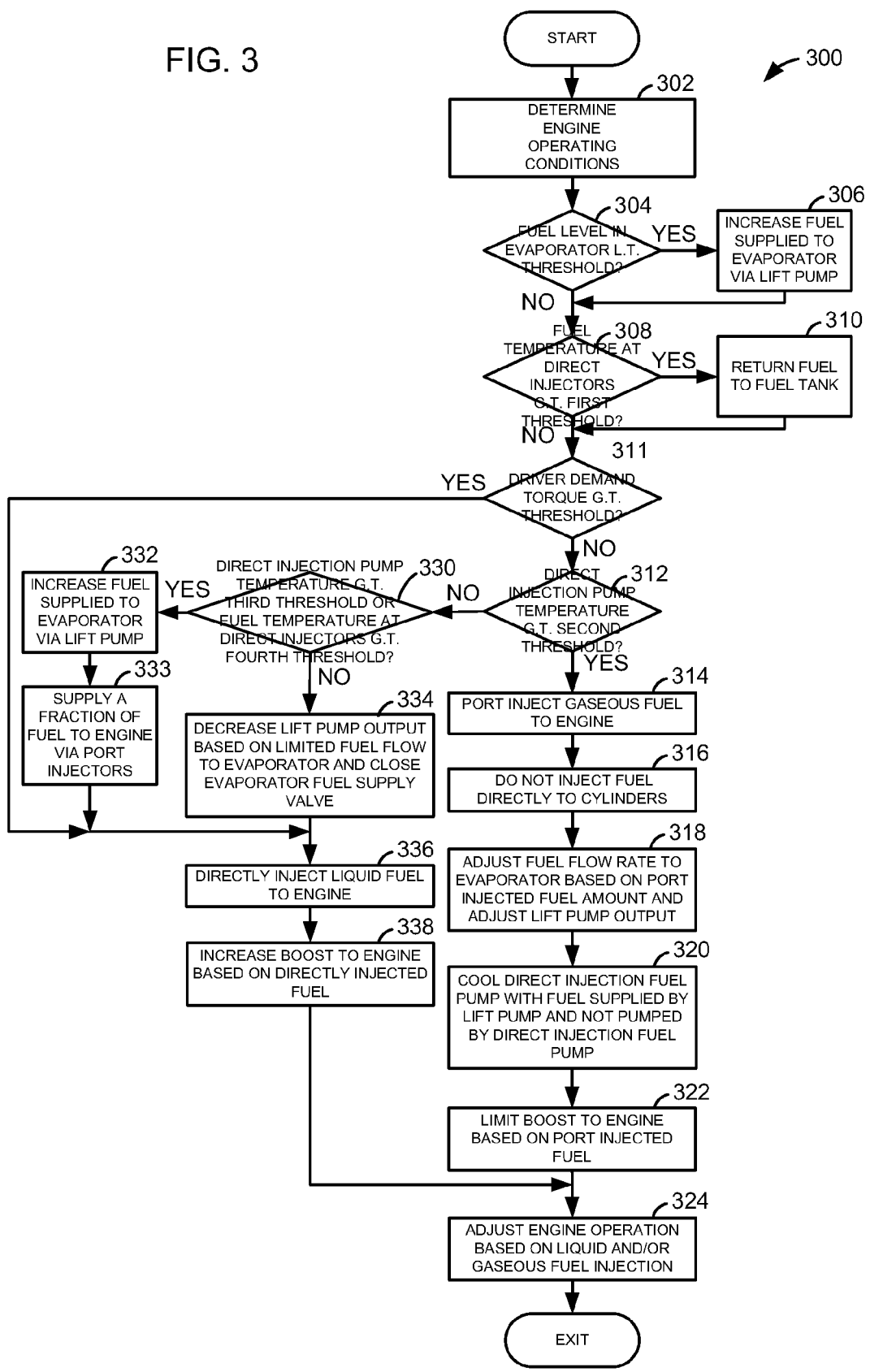
FIG. 3 is a flowchart of an example method for operating the engine.

Referring now to FIG. 3, a method for operating an engine is shown. The method of FIG. 3 may be stored as executable instructions in non-transitory memory of controller 12. Additionally, method 3 may provide the operating sequence shown in FIG. 4.

It may be desirable for a fuel system to be ready for high driver demand torques so that the driver may be supplied the requested torque. Additionally, if LPG temperature near the direct fuel injection pump or direct injection fuel rail is near super critical temperature, then fuel may be returned from the direct fuel injection rail to the fuel tank to cool the fuel.

However, it may be more efficient to cool fuel in the fuel tank via evaporative cooling before the fuel is supplied to the direct injector. The evaporated fuel may be port injected to the engine to remove heat from the fuel system. Thus, it may be desirable to inject a portion of LPG to the engine in a liquid phase while an additional portion of LPG is injected to the engine in a gaseous phase. If fuel temperature is at the direct injection fuel pump or direct injection fuel rail is at or near super critical, the fuel is returned to the fuel tank. Returning fuel to the fuel tank may be reserved for times such as engine starting when it desirable to remove fuel vapor from the fuel rail. The method of FIG. 3 provides for supplying fuel to the engine in this way.

At 302, method 300 determines engine operating conditions. Engine operating conditions may include, but are not limited to engine speed, engine load, engine torque, engine coolant temperature, engine cylinder head temperature, fuel pressure, and ambient temperature. Method 300 proceeds to 304 after engine operating conditions are determined.

At 304, method 300 judges whether or not a level of liquid phase LPG fuel supplied to an evaporator that encloses at least a portion of an exterior portion of a direct fuel injection pump is less than (L.T.) a threshold amount of fuel. In one example, the level of liquid phase CNG is based on output of a fuel level sensor. If method 300 judges that the level of liquid phase or state CNG is less than a threshold level, the answer is yes and method 300 proceeds to 306. Otherwise, the answer is no and method 300 proceeds to 308.

At 306, method 300 increases supply of liquid CNG to the evaporator via opening or increasing the opening amount of evaporator cooling valve 210. Additionally, output of a lift pump 222 may be increased in response to a request to increase the fuel level in the evaporator. Method 300 proceeds to 308 after the flow of LPG to the evaporator 214 is increased.

At 308, method 300 judges whether or not a temperature of fuel at the direct injectors is greater than a first threshold temperature. In one example, the first threshold temperature may be a critical temperature of the fuel. In another example, the first threshold temperature may be a temperature that is less than the critical temperature of the fuel by a predetermined temperature (e.g., 10° C. less than the critical temperature of LPG (96° C.)). If method 300 judges that the fuel temperature at the direct fuel injectors is greater than (G.T.) the first threshold temperature, the answer is yes and method 300 proceeds to 310. Otherwise, the answer is no and method 300 proceeds to 312.

At 310, method 300 returns fuel at the direct injectors back to the fuel tank. In one example, a fuel return valve is opened and fuel is returned to the fuel tank after passing through a condenser. The condenser cools any fuel vapors so that the fuel vapors return to a liquid state. Method 300 proceeds to 311 after the fuel is returned to the fuel tank.

At 311, method 300 judges whether or not driver demand torque is greater than a threshold torque level. If so, the answer is yes and method 300 proceeds to 336. Otherwise, the answer is no and method 300 proceeds to 312. Additionally, method 300 may deactivate port fuel injectors in response to driver demand torque being greater than the threshold torque. Driver demand torque may be determined via a position of an accelerator pedal or a controller command. In this way, priority to supply the engine with liquid LPG at higher engine loads may be provided.

At 312, method 300 judges whether or not a temperature of a direct fuel injection pump is greater than a second threshold temperature. In one example, the second threshold direct fuel injection pump temperature may be a fuel pump temperature that is determined to cause LPG fuel to change from a liquid state to a vapor when the LPG is pumped through the direct injection fuel pump. Further, in some examples, the temperature of liquid LPG delivered to the direct injection fuel pump is added to an estimated temperature increase for pumping LPG through the direct injection fuel pump to determine if the LPG pumped by the direct injection fuel pump will exceed the second threshold temperature (e.g., the critical temperature of the fuel or a temperature below the critical temperature). For example, if LPG is delivered to the direct injection fuel pump at 94° C. and a temperature increase of 5° C. for LPG passing through the fuel pump is expected at the present direct fuel injection pump temperature and fuel flow rate, the temperature is greater than the second threshold temperature. If method 300 judges that the direct injection fuel pump temperature is greater than (G.T.) the second threshold temperature, the answer is yes and method 300 proceeds to 314. Otherwise, the answer is no and method 300 proceeds to 312.

At 314, method 300 injects gaseous fuel to the engine via port injectors. The gaseous fuel is fuel that is vaporized in an evaporator that houses the direct injection fuel pump (e.g., FIGS. 1 and 2). Liquid phase LPG is pumped into the evaporator and heat from the direct injection fuel pump may vaporize the LPG. Fuel that vaporizes may be pumped to the engine at a regulated pressure. Vaporized LPG is used to operate the engine when the phase or state of fuel exiting the direct injection fuel pump may be gaseous or indeterminate. Method 300 proceeds to 316 after gaseous fuel injection to the engine begins.

At 316, method 300 stops injecting fuel to engine cylinders if fuel is being directly injected to engine cylinders. Direct fuel injection may be stopped via closing direct injectors. Additionally, the flow rate of fuel through the direct injection fuel pump may be reduced to near zero. Reducing the amount of fuel pumped through the direct injection fuel pump may help to further reduce the fuel temperature at the fuel pump. Method 300 proceeds to 318 after direct fuel injection to the engine is stopped.

At 318, method 300 adjusts a fuel flow rate to an evaporator. The fuel supplied to the evaporator and the direct injection fuel pump is the same type of fuel (e.g., LPG). In one example, the flow rate of fuel supplied to the evaporator to cool an external portion of the direct injection fuel pump is adjusted proportionately with the amount of fuel injected to the engine. Alternatively, the flow rate of fuel supplied to the evaporator may be adjusted based on a level of fuel in the fuel evaporator. The lift pump output is adjusted to maintain an amount of liquid fuel in the evaporator. Fuel in the gaseous phase is port injected to the engine. Method 300 proceeds to 320 after the fuel flow rate to the evaporator is adjusted.

At 320, method 300 cools the direct injection fuel pump via liquid fuel supplied to the evaporator. The fuel that enters the evaporator is not pumped via the direct injection fuel pump. Rather, heat from the fuel pump vaporizes fuel in the evaporator and the vaporized fuel is injected to the engine or returned to the fuel tank after passing through a condenser. Liquid LPG within the evaporator and outside of the direct injection fuel pump evaporates, and carries heat away from the direct injection fuel pump, thereby cooling the direct injection fuel pump so that the direct injection fuel pump may pump LPG without vaporizing the LPG. Method 300 proceeds to 322 after cooling the direct injection fuel pump begins.

At 322, method 300 reduces engine boost (e.g., air pressure supplied to the engine intake manifold or an area between a throttle and a compressor) based on vaporized LPG being injected to the engine. The engine's boost limit is reduced as compared to boost provided to the engine when the engine is operated with liquid LPG. The gaseous phase LPG may not cool the cylinder charge mixture as well as when liquid phase LPG is injected. Consequently, engine boost may be reduced to reduce the possibility of engine knock. In one example, boost may be reduced via opening a turbocharger waste gate. Method 300 proceeds to 324 after engine boost is adjusted.

At 324, method 300 adjusts engine operation based on injection of liquid or gaseous phase LPG. If liquid phase LPG is injected to the engine, spark timing is advanced as compared to spark timing if the engine were operated at similar conditions with gaseous phase LPG. Further, cam timing adjustments, valve lift adjustments, and other adjustments may be applied depending on whether liquid or gaseous phase LPG is injected to the engine. Method 300 proceeds to exit after engine actuators are adjusted to compensate for the phase of fuel injected.

At 330, method 300 judges whether or not temperature at the direct injection fuel pump is greater than a third threshold temperature or if fuel temperature at the direct fuel injectors is greater than a fourth threshold temperature. The third threshold temperature is less than the first threshold temperature and the fourth threshold temperature is less than the second threshold temperature. By adjusting fuel flow to the evaporator before the temperature at the direct fuel injectors or the direct injection fuel pump reaches either the first or second threshold temperature, it may be possible to reduce the possibility of vaporizing liquid LPG that is pumped via the direct injection fuel pump. If method 300 judges that direct injection fuel pump temperature is greater than the third threshold temperature or if fuel temperature at the direct fuel injectors is greater than the fourth threshold, the answer is yes and method 300 proceeds to 332. Otherwise, the answer is no and method 300 proceeds to 334.

Alternatively, or in addition to determining if direct injection pump temperature is greater than a third threshold, method 300 may judge whether or not vapor pressure in the port fuel injection rail is greater than 2.5 bar. If so, the answer is yes and method 300 proceeds to 332. Otherwise, the answer is no and method 300 proceeds to 334. In this way, priority may be provide to cool the direct injection fuel pump and direct injection fuel rail via evaporative cooling instead of by recirculating fuel to the fuel tank.

At 332, method 300 increases fuel supplied to the evaporator via the lift pump. By increasing fuel flow to the evaporator via the lift pump, the direct injection fuel pump may be cooled at a more rapid rate. In one example, an average voltage supplied to the lift pump is increased to increase flow from the fuel tank to the evaporator. Fuel supplied to the evaporator is not pumped and does not travel through the direct injection fuel pump. Method 300 proceeds to 333 after fuel flow to the evaporator is increased.

At 333, method 300 operates port fuel injectors and delivers a fraction of LPG fuel to the engine in a gaseous state. The remaining fraction of fuel provided to the engine is provided in a liquid state at 336. The total mass of fuel provided to an engine cylinder is the mass of LPG in a gaseous state and the mass of LPG injected in a liquid state. Method 300 proceeds to 336.

At 334, method 300 decreases lift pump output and the evaporator fuel supply valve is closed. Further, port fuel injectors are deactivated. The lift pump output may be reduced and the evaporator fuel supply valve may be closed when a level of liquid LPG in the evaporator reaches a predetermined desired level. Method 300 proceeds to 336 after the lift pump output is adjusted.

At 336, method 300 begins directly injecting liquid fuel to the engine via direct injectors. The amount of fuel injected is varied as engine demand torque and engine speed varies. Method 300 proceeds to 338 after injection of liquid fuel to the engine via direct injectors begins.

At 338, method 300 increases boost supplied to the engine. The engine boost amount is increased to increase engine performance. Since injecting liquid LPG may allow the engine to operate at higher engine speeds and torque demands without encountering engine knocking, boost pressure limits for the engine are increased. Boost pressure may be increased via closing a turbocharger waste gate. Method 300 proceeds to 324 after engine boost limits are increased.

Thus, the method of FIG. 6 provides for operating an engine, comprising: cooling a direct injection fuel pump with a liquid fuel, the liquid fuel not pumped via the direct injection fuel pump. The method includes where the direct injection fuel pump is mechanically coupled to the engine. The method includes where the liquid fuel is vaporized into a gaseous fuel. The method includes where the gaseous fuel is returned to a fuel tank via a condenser. The method further comprises port injecting the gaseous fuel to the engine. The method further comprises adjusting boost in response to injecting the gaseous fuel to the engine. The method includes where the direct injection fuel pump is enclosed in an evaporator.

The method of FIG. 3 also provides for operating an engine, comprising: cooling a direct injection fuel pump with a first liquid fuel, the first liquid fuel not pumped via the direct injection fuel pump; and injecting a second liquid fuel pumped through the direct injection fuel pump to the engine. The method includes where the first liquid fuel and the second liquid fuel are a same type of fuel. The method includes where the first liquid fuel vaporizes to form a gaseous fuel, and where the gaseous fuel is injected to the engine. The method also includes where fuel pumped through the direct injection fuel pump is injected to the engine without injecting the gaseous fuel. The method further comprises returning the gaseous fuel to a fuel tank via a condenser. The method further comprises returning gases formed from the second liquid fuel to a fuel tank via a condenser.

Figure 4:
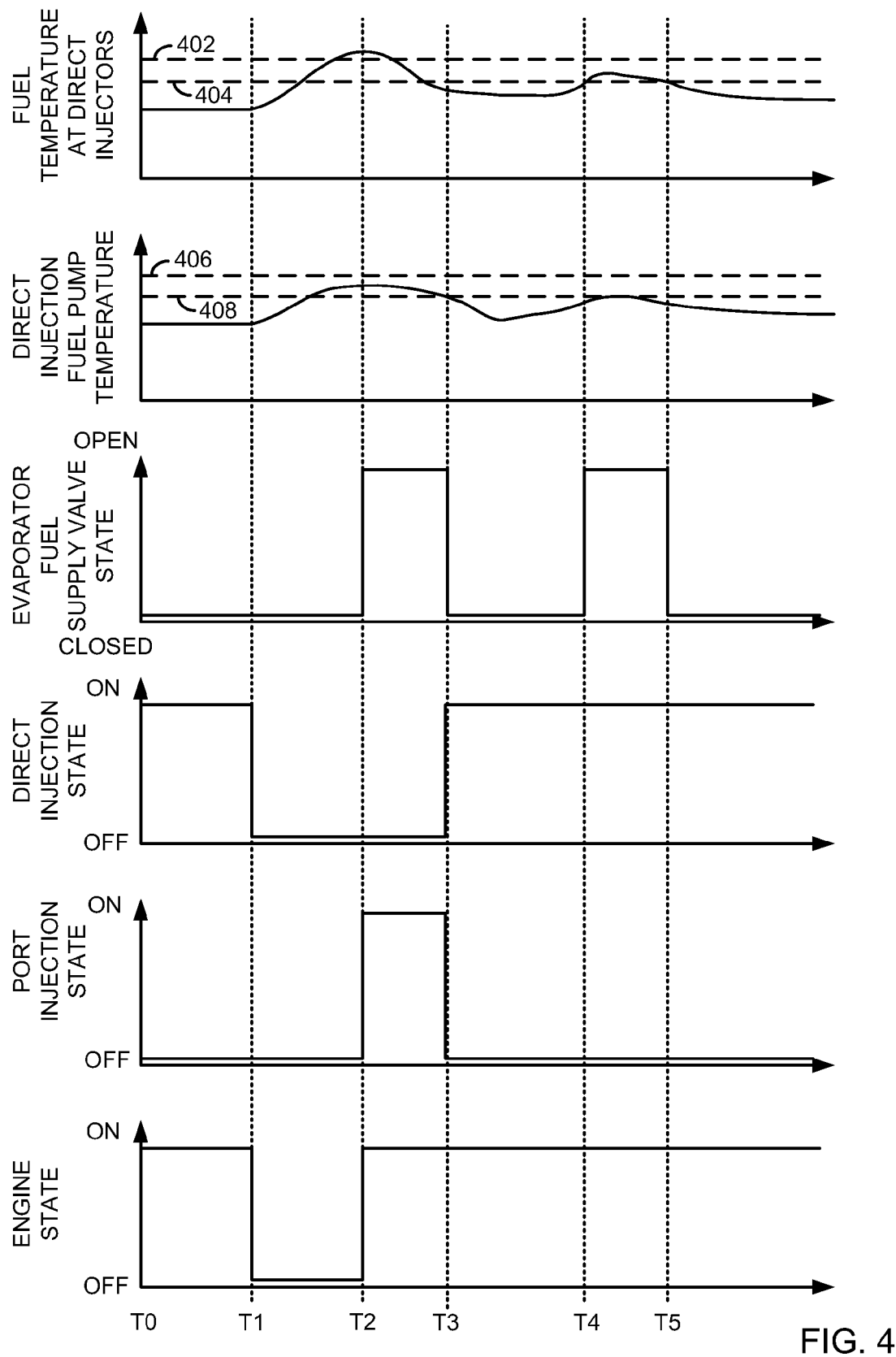
FIG. 4 is an example prophetic engine operating sequence according to the method of FIG. 3.

Referring now to FIG. 4, an example engine operating sequence is shown. The example engine operating sequence of FIG. 4 may be provided via the system shown in FIGS. 1 and 2 executing the method of FIG. 3. Vertical markers T0-T5 represent times of interest during the operating sequence.

The first plot from the top of FIG. 4 represents temperature of fuel at direct fuel injectors versus time. The X axis represents time and time increases from the left side of the plot to the right side of the plot. The Y axis represents temperature of fuel at the direct fuel injectors and temperature of fuel at the direct fuel injectors increases in the direction of the Y axis arrow. Horizontal line 402 represents a threshold direct injection fuel temperature (e.g., a super critical temperature of LPG and first threshold temperature). Horizontal line 404 represents another threshold direct injection fuel temperature (e.g., a temperature below the critical temperature of LPG and a fourth threshold temperature).

The second plot from the top of FIG. 4 represents direct injection fuel pump temperature versus time. The X axis represents time and time increases from the left side of the plot to the right side of the plot. The Y axis represents direct injection fuel pump temperature and direct injection fuel pump temperature increases in the direction of the Y axis arrow. Horizontal line 406 represents a threshold direct injection fuel pump temperature (e.g., a second threshold temperature). Horizontal line 408 represents another threshold direct injection fuel pump temperature (e.g., a third threshold temperature).

The third plot from the top of FIG. 4 represents evaporator fuel supply valve state versus time. The X axis represents time and time increases from the left side of the plot to the right side of the plot. The Y axis represents evaporator fuel supply valve state and the evaporator fuel supply valve state is open when the evaporator fuel supply valve state trace is at a higher level. The evaporator fuel supply valve state is closed when the evaporator fuel supply valve state trace is at a lower level.

The fourth plot from the top of FIG. 4 represents direct injection state versus time. The X axis represents time and time increases from the left side of the plot to the right side of the plot. The Y axis represents direct injection state and the direct injection state is on (e.g., directly injecting fuel) when the direct injection state trace is at a higher level. The direct injection state is off (e.g., not directly injecting fuel) when the direct injection state trace is at a lower level.

The fifth plot from the top of FIG. 4 represents port injection state versus time. The X axis represents time and time increases from the left side of the plot to the right side of the plot. The Y axis represents port injection state and the port injection state is on (e.g., port injecting fuel) when the port injection state trace is at a higher level. The port injection state is off (e.g., not directly injecting fuel) when the port injection state trace is at a lower level.

The sixth plot from the top of FIG. 4 represents engine state versus time. The X axis represents time and time increases from the left side of the plot to the right side of the plot. The Y axis represents engine state and the engine state is on when the engine state trace is at a higher level. The engine state is closed when the engine state trace is at a lower level.

At time T0, the engine is operating and combusting an air-fuel mixture as indicated by the engine state being at a higher level. The direct injection fuel temperature and the direct injection fuel pump temperature are less than thresholds 402-408. The evaporator is not being supplied fuel since the evaporator fuel supply valve is in a closed state. Liquid state LPG is being directly injected to engine since the direct injection state in on. Gaseous state LPG is not being port injected to the engine since the port injection state is off as indicated by the lower level trace.

At time T1, the engine operating state transitions to a lower level to indicate that engine rotation is stopped. The engine may stop in response to a driver request or the engine may be stopped automatically. The direct injection state also transitions to a lower level to indicate fuel is not being directly injected at engine stop. The port fuel injection also remains stopped and the evaporator fuel supply valve state remains closed. The direct injection fuel pump temperature and direct injection fuel temperature remain below temperature thresholds 402-408.

Between time T1 and time T2, the direct injection fuel temperature and the direct injection fuel pump temperature increase in response to heat remaining within the engine during the engine stop. The direct injection fuel temperature increases above threshold temperatures 402 and 404. The direct injection fuel pump temperature increases above threshold temperature 408, but it remains below threshold temperature 406. The engine state, port injection state, direct injection state, and evaporator fuel supply valve state remain unchanged.

At time T2 then engine state transitions to a higher level to indicate that the engine is started in response to a driver demand (not shown). The port injection state also transitions from a lower level to a higher level to indicate that port fuel injection is activated. Direct fuel injection state remains at a lower level to indicate that direct fuel injection is deactivated. The evaporator fuel supply valve state also transitions to a higher level to indicate that the evaporator fuel supply valve (e.g., 210 of FIG. 2) is open. The direct injection fuel temperature remains above thresholds 402 and 404. The direct injection fuel pump temperature remains above temperature threshold 408. Additionally, a fuel return valve that allows fuel vapors to flow from the direct fuel injectors to the fuel tank may be opened.

During a hot engine soak (e.g., engine stop while the engine is warm), engine heat may increase direct fuel injector pump temperature so that fuel in the fuel evaporator vaporizes. The vaporized fuel is injected when the engine is restarted and the direct injection fuel temperature is greater than threshold 402.

Between time T2 and time T3, fuel continues to flow from a fuel tank to the evaporator. Fuel in the evaporator draws heat away from the direct injection fuel pump as indicated by the direct injection fuel pump temperature decreasing. The fuel temperature at the direct injectors also decreases.

At time T3, the fuel temperature at the direct injection fuel pump and the fuel temperature at the direct fuel injectors is less than thresholds 404 and 408. The direct injectors are activated and the port injectors are deactivated in response to temperature at the direct fuel injectors being less than threshold 404 and temperature at the direct injection fuel pump being less than threshold 408. Additionally, the evaporator fuel supply valve state is transitioned to a lower level to indicate that the evaporator fuel supply valve is closed. The engine remains operating. In this way, the engine may switch from injecting gaseous phase LPG to injecting liquid phase LPG.

Between time T3 and time T4, the fuel temperature at the direct fuel injector and the temperature of the direct injection fuel pump decreases and then begins to increase. The evaporator fuel supply valve state, direct injection state, port injection state, and engine state remain unchanged. The fuel temperature at the direct injectors and the direct injection fuel pump temperature may increase after the engine is operated at low load shortly after being operated at a higher load.

At time T4, the fuel temperature at the direct injectors has increased to above level 404. Further, the direct injection fuel pump temperature is approaching but has not reached level 408. The evaporator fuel supply valve state transitions from the lower level to the higher level in response to fuel temperature at the direct injectors increasing above level 404. Opening the evaporator fuel supply valve allows liquid LPG to flow to the evaporator, generate gaseous phase LPG, and cool the direct injection fuel pump. The liquid phase LPG pumped by the direct injection fuel pump is also cooled by fuel flowing to the evaporator. The direct injection state, the port injection state, and the engine state remain at same levels.

At time T5, the fuel temperature at the direct injectors has cooled to be below level 404. The direct injection fuel pump temperature is also cooled to a level below level 408. The evaporator fuel supply valve state transitions to a closed state and stops fuel flow to the evaporator in response to the fuel temperature at the direct injectors being below level 404. The direct injection state, port injection state, and engine state remain at the same levels.

Thus, fuel may flow to the evaporator when fuel temperature at the direct injectors is greater than a threshold level without activating the port fuel injectors. However, if fuel temperature at the direct injectors is even higher, fuel flow to the evaporator may be activated along with activating the port fuel injectors. Activating the port fuel injectors allows the engine to consume the gaseous phase LPG so that it does not have to be returned to the fuel tank.

As will be appreciated by one of ordinary skill in the art, routine described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
   cooling a direct injection fuel pump with a liquid fuel, the liquid fuel not pumped via the direct injection fuel pump; and
   reducing an amount of fuel pumped through the direct injection fuel pump in response to the direct injection fuel pump exceeding a threshold temperature.

2. The method of claim 1, where the direct injection fuel pump is mechanically coupled to the engine.

3. The method of claim 1, where the liquid fuel is vaporized into a gaseous fuel.

4. The method of claim 3, further comprising port injecting the gaseous fuel to the engine.

5. The method of claim 4, where a port fuel injector pulse width is adjusted in response to a pressure of the gaseous fuel.

6. The method of claim 1, further comprising adjusting boost in response to injecting the gaseous fuel to the engine.

7. The method of claim 1, where the direct injection fuel pump is enclosed in an evaporator.

8. The method of claim 1, wherein reducing the amount of fuel pumped through the direct injection fuel pump includes stopping direct injection of the fuel.

9. The method of claim 8, wherein reducing the amount of fuel pumped through the direct injection fuel pump includes reducing the amount of fuel pumped to near zero.

10. A method for operating an engine, comprising:
    cooling a direct injection fuel pump with a first liquid fuel, the first liquid fuel not pumped via the direct injection fuel pump;
    vaporizing the first liquid fuel via an evaporator to form a gaseous fuel;
    injecting the gaseous fuel from the evaporator to the engine via a conduit; and
    injecting a second liquid fuel pumped through the direct injection fuel pump to the engine.

11. The method of claim 10, where the first liquid fuel and the second liquid fuel are a same type of fuel.

12. The method of claim 10, further comprising adjusting boost in response to injecting the gaseous fuel to the engine.

13. The method of claim 10, where the first fuel vaporized to form the gaseous fuel is injected to the engine via port injection.

14. The method of claim 12, further comprising adjusting a pulse width of a port fuel injector in response to a pressure of the gaseous fuel.

15. The method of claim 10, further comprising returning gases formed from the second liquid fuel to a fuel tank via a condenser.

* * * * *